United States Patent
Liu

(10) Patent No.: US 9,304,900 B2
(45) Date of Patent: Apr. 5, 2016

(54) DATA READING METHOD, MEMORY CONTROLLER, AND MEMORY STORAGE DEVICE

(71) Applicant: PHISON ELECTRONICS CORP., Miaoli (TW)

(72) Inventor: Shao-Hsien Liu, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 408 days.

(21) Appl. No.: 13/802,770

(22) Filed: Mar. 14, 2013

(65) Prior Publication Data

US 2014/0181372 A1    Jun. 26, 2014

(30) Foreign Application Priority Data

Dec. 24, 2012  (TW) .............................. 101149591 A

(51) Int. Cl.
*G06F 12/08*    (2006.01)
*G06F 12/02*    (2006.01)

(52) U.S. Cl.
CPC ........ *G06F 12/0246* (2013.01); *G06F 12/0862* (2013.01); *G06F 2212/6022* (2013.01); *G06F 2212/6026* (2013.01); *G06F 2212/7201* (2013.01); *G06F 2212/7203* (2013.01)

(58) Field of Classification Search
CPC ................................................ G06F 12/0862
See application file for complete search history.

(56) References Cited

U.S. PATENT DOCUMENTS

| 7,958,301 | B2 | 6/2011 | Sutardja |
| 8,156,403 | B2 | 4/2012 | Shalvi et al. |
| 2005/0223175 | A1* | 10/2005 | Hepner et al. ................. 711/137 |
| 2007/0106849 | A1* | 5/2007 | Moore et al. ................... 711/137 |
| 2008/0086588 | A1* | 4/2008 | Danilak et al. ................. 711/103 |

OTHER PUBLICATIONS

"Office Action of Taiwan Counterpart Application", issued on May 27, 2014, p. 1-p. 8.

* cited by examiner

*Primary Examiner* — Edward Dudek, Jr.
(74) *Attorney, Agent, or Firm* — Jianq Chyun IP Office

(57) ABSTRACT

A data reading method, a memory controller, and a memory storage device are provided. The data reading method is adapted to a rewritable non-volatile memory module having a plurality of physical erasing units. The data reading method includes following steps. A plurality of logical addresses is configured to be mapped to a part of the physical erasing units. A plurality of read commands is received from a host system. The read commands instruct to read a plurality of first logical addresses among aforementioned logical addresses. The read commands are executed, and whether the first logical addresses are successive is determined. If the first logical addresses are successive, data belonging to a logical range is pre-read from the physical erasing units into a buffer memory. Thereby, the data reading speed is increased.

26 Claims, 8 Drawing Sheets

DATA READING METHOD, MEMORY CONTROLLER, AND MEMORY STORAGE DEVICE

CROSS-REFERENCE TO RELATED APPLICATION

This application claims the priority benefit of Taiwan application serial no. 101149591, filed on Dec. 24, 2012. The entirety of the above-mentioned patent application is hereby incorporated by reference herein and made a part of this specification.

BACKGROUND

1. Technology Field

The invention generally relates to a data reading method, and more particularly, to a data reading method adapted to a rewritable non-volatile memory module, and a memory controller and a memory storage device using the data reading method.

2. Description of Related Art

Along with the widespread of digital cameras, cell phones, and MP3 players in recently years, the consumers' demand to storage media has increased drastically. Rewritable non-volatile memory (for example, flash memory) is one of the most adaptable storage media to aforementioned portable multimedia devices due to its many characteristics such as data non-volatility, low power consumption, small volume, and non-mechanical structure.

Generally, a rewritable non-volatile memory module is controlled by a memory controller. The memory controller receives read commands from a host system and reads data from the rewritable non-volatile memory module according to the received read commands. The memory controller also establishes a command queue for storing the read commands received from the host system. The memory controller determines the execution sequence of the read commands in the command queue. Besides, the memory controller pre-reads some data from the rewritable non-volatile memory module and stores such data into a buffer memory, so that when the host system needs to read data from a plurality of continuous addresses, the data reading speed can be increased. However, because the host system may not issue the read commands to the memory controller in sequence, the pre-read data may be cleared from the buffer memory. Thereby, how to increase the data reading speed is a subject to be resolved in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Exemplary embodiments of the invention provide a data reading method, a memory controller, and a memory storage device, in which the data reading speed is increased.

An exemplary embodiment of the invention provides a data reading method for a rewritable non-volatile memory module. The rewritable non-volatile memory module includes a plurality of physical erasing units. The data reading method includes following steps. A plurality of logical addresses is configured to be mapped to a part of the physical erasing units. A plurality of first read commands is received from a host system. The first read commands instruct to read a plurality of first logical addresses among aforementioned logical addresses. The first read commands are executed, and whether the first logical addresses are successive is determined. If the first logical addresses are successive, data belonging to a first logical range is pre-read from the physical erasing units into a buffer memory.

An exemplary embodiment of the invention provides a memory storage device including a connector, a rewritable non-volatile memory module, and a memory controller. The connector is configured to couple to a host system. The rewritable non-volatile memory module includes a plurality of physical erasing units. The memory controller is coupled to the connector and the rewritable non-volatile memory module. The memory controller configures a plurality of logical addresses to be mapped to a part of the physical erasing units and receives a plurality of first read commands from the host system. The first read commands instruct to read a plurality of first logical addresses among aforementioned logical addresses. The memory controller also executes the first read commands and determines whether the first logical addresses are successive. If the first logical addresses are successive, the memory controller pre-reads data belonging to a first logical range in the logical addresses from the physical erasing units into a buffer memory.

An exemplary embodiment of the invention provides a memory controller for controlling a rewritable non-volatile memory module. The memory controller includes a host interface, a memory interface, and a memory management circuit. The host interface is configured to couple to a host system. The memory interface is configured to couple to the rewritable non-volatile memory module. The rewritable non-volatile memory module includes a plurality of physical erasing units. The memory management circuit is coupled to the host interface and the memory interface. The memory management circuit configures a plurality of logical addresses to be mapped to a part of the physical erasing units and receives a plurality of first read commands from the host system. The first read commands instruct to read a plurality of first logical addresses among aforementioned logical addresses. The memory management circuit executes the first read commands and determines whether the first logical addresses are successive. If the first logical addresses are successive, the memory management circuit pre-reads data belonging to a first logical range in the logical addresses from the physical erasing units into a buffer memory.

As described above, in a data reading method, a memory controller, and a memory storage device provided by the exemplary embodiments of the invention, whether data is pre-read is determined according to whether some executed read commands read successive logical addresses. Thereby, the data reading speed is increased.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
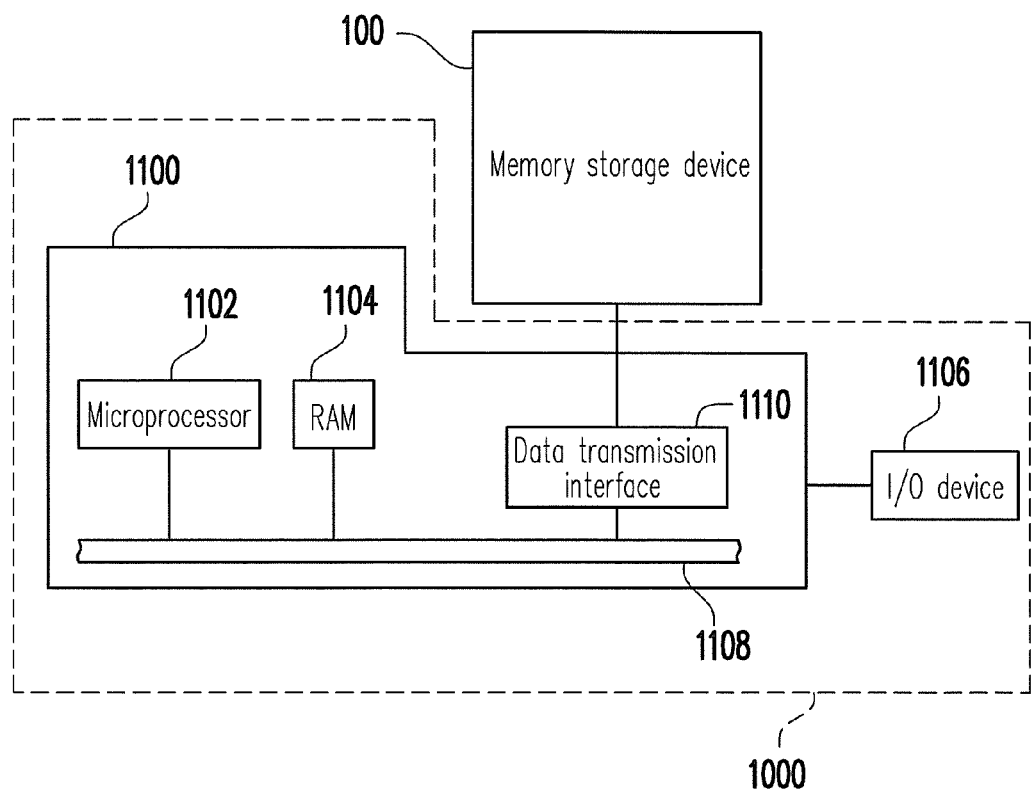
FIG. 1A illustrates a host system and a memory storage device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

[First Exemplary Embodiment]

Generally speaking, a memory storage device (also referred to as a memory storage system) includes a rewritable non-volatile memory module and a controller (also referred to as a control circuit). A memory storage device is usually used with a host system so that the host system can write data into or read data from the memory storage device.

FIG. 1A illustrates a host system and a memory storage device according to an exemplary embodiment of the invention.

Figure 1B:
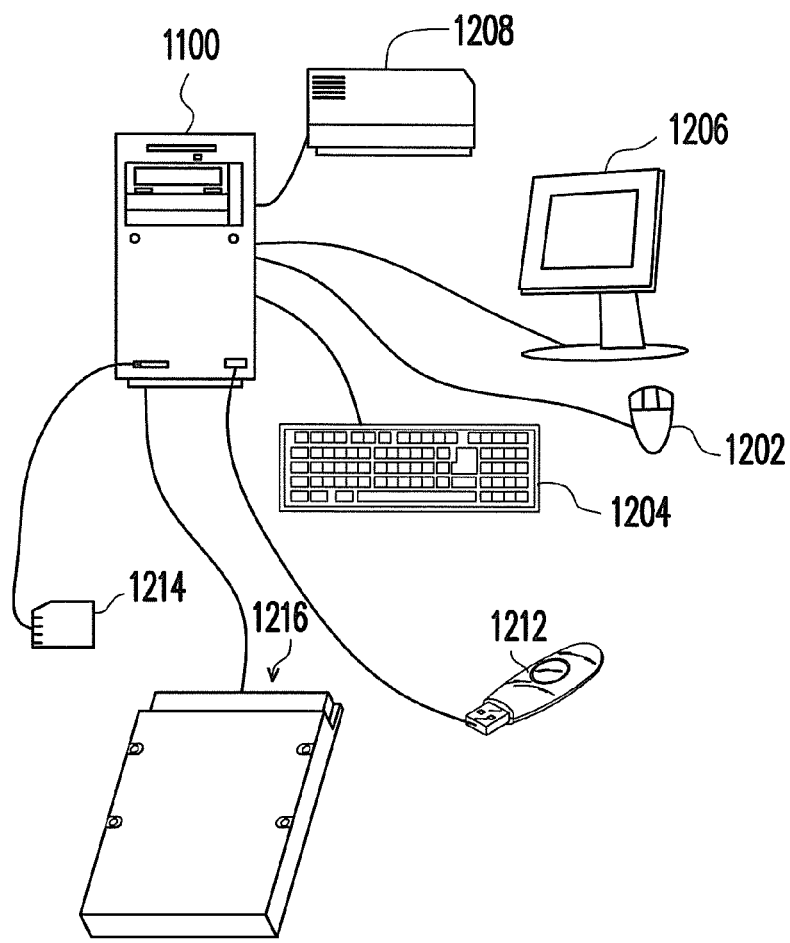
FIG. 1B is a diagram of a computer, an input/output (I/O) device, and a memory storage device according to an exemplary embodiment of the invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. However, the I/O device 1106 is not limited to the devices illustrated in FIG. 1B and may further include other devices.

In the present embodiment, a memory storage device 100 is coupled to other components of the host system 1000 through the data transmission interface 1110. Data can be written into or read from the memory storage device 100 through operations of the microprocessor 1102, the RAM 1104, and the I/O device 1106. The memory storage device 100 is a rewritable non-volatile memory storage device, such as the flash drive 1212, the memory card 1214, or the solid state drive (SSD) 1216 illustrated in FIG. 1B.

Figure 1C:
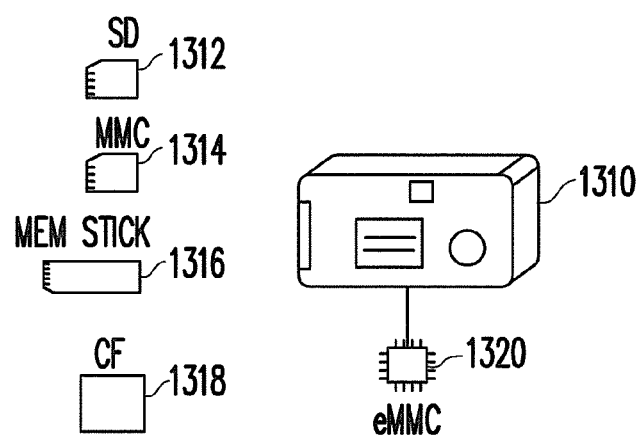
FIG. 1C is a diagram of a host system and a memory storage device according to an exemplary embodiment of the invention.

Generally speaking, the host system 1000 can be substantially any system that works with the memory storage device 100 to store data. Even though the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the rewritable non-volatile memory storage device is then a secure digital (SD) card 1312, a multi media card (MMC) card 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be mentioned that an eMMC is directly coupled to the motherboard of a host system.

Figure 2:
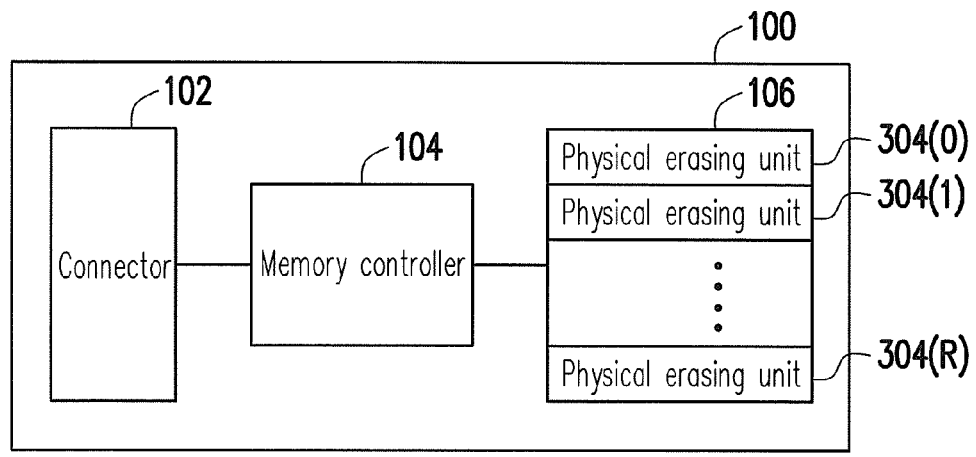
FIG. 2 is a schematic block diagram of the memory storage device in FIG. 1A.

FIG. 2 is a schematic block diagram of the memory storage device in FIG. 1A.

Referring to FIG. 2, the memory storage device 100 includes a connector 102, a memory controller 104, and a rewritable non-volatile memory module 106.

In the present exemplary embodiment, the connector 102 complies with the serial advanced technology attachment (SATA) standard. However, the invention is not limited thereto, and the connector 102 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the SD interface standard, the ultra high speed-I (UHS-I) interface standard, the ultra high speed-II (UHS-II) interface standard, the MS interface standard, the MMC interface standard, the eMMC interface standard, the universal flash storage (UFS) interface standard, the CF interface standard, the integrated device electronics (IDE) standard, or any other suitable standard.

The memory controller 104 executes a plurality of logic gates or control instructions implemented in a hardware form or a firmware form and performs data writing, reading, and erasing operations on the rewritable non-volatile memory module 106 according to commands issued by the host system 1000.

The rewritable non-volatile memory module 106 is coupled to the memory controller 104 and configured to store data written by the host system 1000. The rewritable non-volatile memory module 106 has physical erasing units 304(0)-304(R). The physical erasing units 304(0)-304(R) may belong to a same memory die or different memory dies. Each physical erasing unit has a plurality of physical programming units. Those physical programming units belonging to the same physical erasing unit can be individually written but have to be erased all together. Each physical erasing unit may be composed of 128 physical programming units. However, the invention is not limited thereto, and each physical erasing unit may also be composed of 64, 256, or any other number of physical programming units.

To be specific, a physical erasing unit is the smallest unit for erasing data. Namely, each physical erasing unit contains the least number of memory cells that are erased all together. A physical programming unit is the smallest unit for programming data. Namely, a physical programming unit is the smallest unit for writing data. Each physical programming unit usually includes a data bit area and a redundant bit area. The data bit area includes a plurality of physical access addresses for storing user data, and the redundant bit area is used for storing system data (for example, control information and error checking and correcting codes (ECCs)). In the present exemplary embodiment, the data bit area of each physical programming unit includes 4 physical access addresses, and the size of each physical access address is 512 bytes (B). However, the size and number of the physical access addresses are not limited in the invention, and in other exemplary embodiments, a data bit area may also include, 8, 16, or any greater or smaller number of physical access addresses. The physical erasing units may be physical blocks, and the physical programming units may be physical pages or physical sectors.

In the present exemplary embodiment, the rewritable non-volatile memory module 106 is a multi level cell (MLC) NAND flash memory module (i.e., each memory cell stores at least 2 bits of data). However, the invention is not limited thereto, and the rewritable non-volatile memory module 106 may also be a single level cell (SLC) NAND flash memory module, a trinary level cell (TLC) NAND flash memory module, any other flash memory module, or any memory module having the same characteristics.

Figure 3:
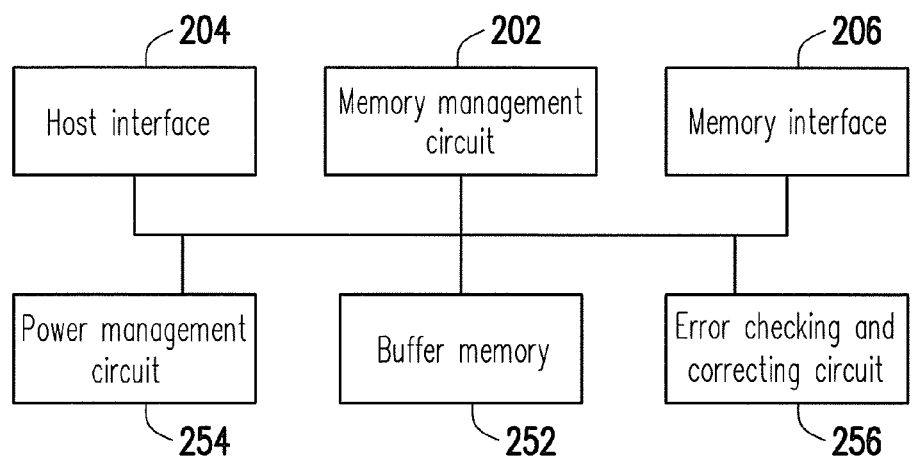
FIG. 3 is a schematic block diagram of a memory controller according to an exemplary embodiment of the invention.

FIG. 3 is a schematic block diagram of a memory controller according to an exemplary embodiment of the invention.

Referring to FIG. 3, the memory controller 104 includes a memory management circuit 202, a host interface 204, and a memory interface 206.

The memory management circuit 202 controls the overall operation of the memory controller 104. To be specific, the memory management circuit 202 has a plurality of control instructions, and when the memory storage device 100 is in operation, the control instructions are executed to perform various data writing, data reading, and data erasing operations.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage device 100 is in operation, the control instructions are executed by the microprocessor unit to carry out data writing, data reading, and data erasing operations.

In another exemplary embodiment of the invention, the control instructions of the memory management circuit 202 may also be stored in a specific area of the rewritable non-volatile memory module 106 (for example, a system area exclusively used for storing system data in a memory module) as program codes. In addition, the memory management circuit 202 has a microprocessor unit (not shown), a ROM (not shown), and a RAM (not shown). In particular, the ROM has boot codes. When the memory controller 104 is enabled, the microprocessor unit first executes the boot codes to load the control instructions from the rewritable non-volatile memory module 106 into the RAM of the memory management circuit 202. Thereafter, the microprocessor unit runs the control instructions to perform various data writing, reading, and erasing operations.

In yet another exemplary embodiment of the present invention, the control instructions of the memory management circuit 202 may also be implemented in a hardware form. For example, the memory management circuit 202 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are coupled to the microcontroller. The memory management unit is configured to manage physical erasing units of the rewritable non-volatile memory module 106. The memory writing unit is configured to issue a write command to the rewritable non-volatile memory module 106 to write data into the rewritable non-volatile memory module 106. The memory reading unit is configured to issue a read command to the rewritable non-volatile memory module 106 to read data from the rewritable non-volatile memory module 106. The memory erasing unit is configured to issue an erase command to the rewritable non-volatile memory module 106 to erase data from the rewritable non-volatile memory module 106. The data processing unit is configured to process data to be written into and read from the rewritable non-volatile memory module 106.

The host interface 204 is coupled to the memory management circuit 202 and configured to receive and identify commands and data from the host system 1000. Namely, commands and data transmitted by the host system 1000 are sent to the memory management circuit 202 through the host interface 204. In the present exemplary embodiment, the host interface 204 complies with the SATA standard. However, the invention is not limited thereto, and the host interface 204 may also comply with the PATA standard, the IEEE 1394 standard, the PCI express standard, the USB standard, the SD standard, the UHS-I standard, the UHS-II standard, the MS standard, the MMC standard, the eMMC standard, the UFS standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the invention, the memory controller 104 further includes a buffer memory 252, a power management circuit 254, and an ECC circuit 256.

The buffer memory 252 is coupled to the memory management circuit 202 and configured to temporarily store data and commands from the host system 1000 or data from the rewritable non-volatile memory module 106.

The power management circuit 254 is coupled to the memory management circuit 202 and configured to control the power supply of the memory storage device 100.

The ECC circuit 256 is coupled to the memory management circuit 202 and configured to perform an ECC procedure to ensure data accuracy. To be specific, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit 256 performs the ECC procedure on the data according to the ECC code.

Figure 4:
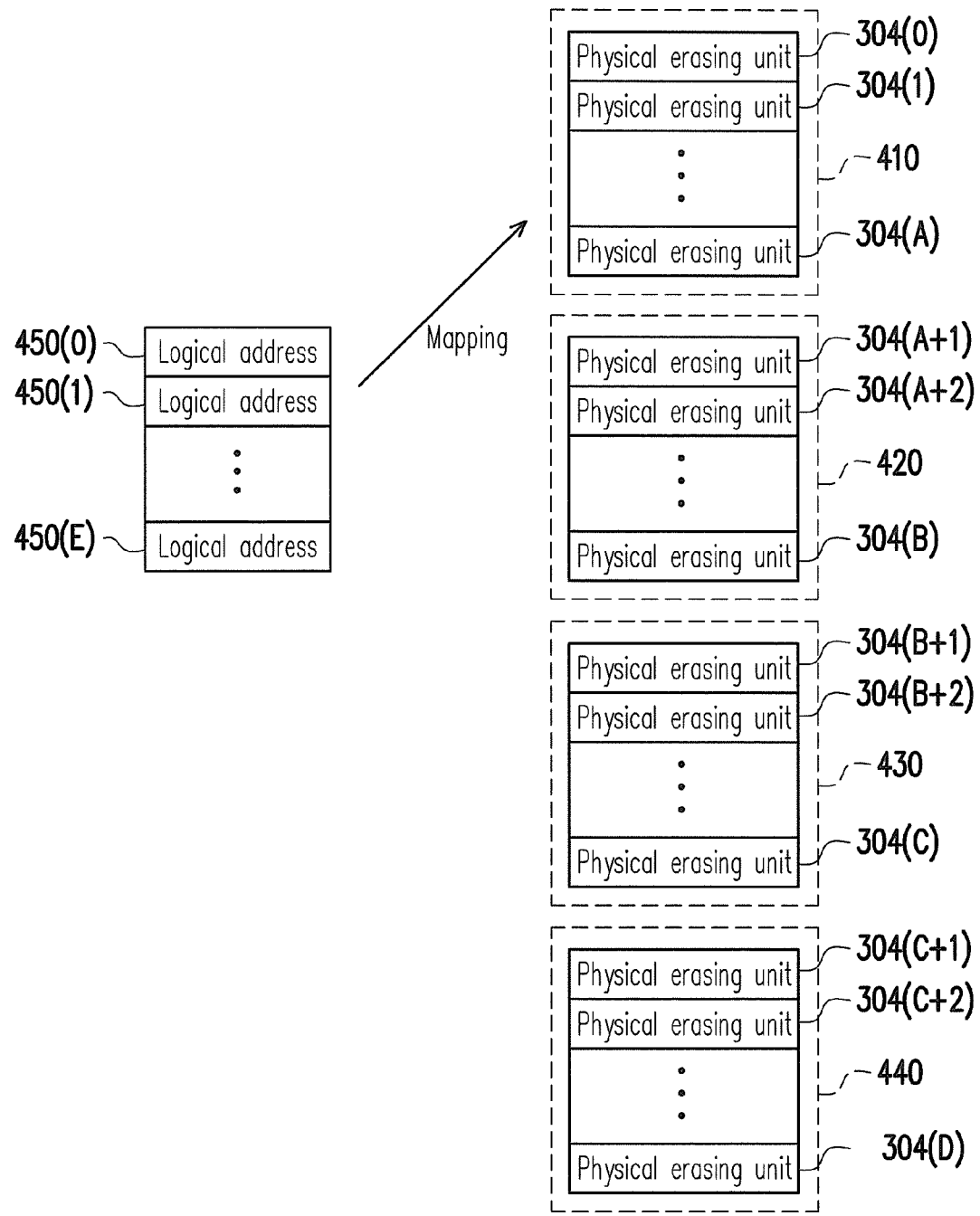
FIG. 4 is a diagram illustrating an example of managing a rewritable non-volatile memory module according to an exemplary embodiment of the invention.

FIG. 4 is a diagram illustrating an example of managing a rewritable non-volatile memory module according to an exemplary embodiment of the invention.

It should be understood that while describing the operations performed on the physical erasing units of the rewritable non-volatile memory module 106, the terms like "select", "substitute", "group", and "alternate" refer to logical operations performed on these physical erasing units. Namely, the actual positions of the physical erasing units in the rewritable non-volatile memory module 106 are not changed and the operations are logically performed on the physical erasing units of the rewritable non-volatile memory module 106.

Referring to FIG. 4, the memory controller 104 logically groups the physical erasing units 304(0)-304(R) of the rewritable non-volatile memory module into a plurality of areas, such as a data area 410, a spare area 420, a system area 430, and a replacement area 440. In another exemplary embodiment, the replacement area 440 and the spare area 420 may share physical erasing units containing invalid data.

Physical erasing units in the data area 410 and the spare area 420 are used for storing data from the host system 1000. To be specific, physical erasing units in the data area 410 are physical erasing units containing data, while physical erasing units in the spare area 420 are used for substituting the physical erasing units in the data area 410. Thus, the physical erasing units in the spare area 420 are either blank or available physical erasing units (i.e., no data is recorded therein or data stored therein is marked as invalid data). Namely, erase operations have been performed on the physical erasing units in the spare area 420. Or, when a physical erasing unit in the spare area 420 is selected for storing data, an erase operation is first performed on the selected physical erasing unit. Thus, the physical erasing units in the spare area 420 are usable physical erasing units.

Physical erasing units logically belonging to the system area 430 are used for recording system data. Herein the system data includes the manufacturer and model number of the memory chip, the number of physical erasing units in the memory chip, and the number of physical programming units in each physical erasing unit, etc.

Physical erasing units logically belonging to the replacement area 440 are used for replacing physical erasing units. For example, 4% of the physical erasing units in a rewritable non-volatile memory module are reserved for replacement purpose when the rewritable non-volatile memory module is just manufactured. Namely, when the physical erasing units in the data area 410, the spare area 420, and the system area 430 are damaged, the physical erasing units in the replacement area 440 are used for replacing the damaged physical erasing units (i.e., bad erasing units). Thus, if there are still normal physical erasing units in the replacement area 440 and a physical erasing unit is damaged, the memory controller 104 selects a normal physical erasing unit from the replacement area 440 to replace the damaged physical erasing unit. If there is no more normal physical erasing unit in the replacement area 440 and a physical erasing unit is damaged, the memory controller 104 declares that the memory storage device 100 enters a write protect state and no data should be written therein.

In particular, the numbers of physical erasing units in the data area 410, the spare area 420, the system area 430, and the replacement area 440 vary with different memory specifications. In addition, during the operation of the memory storage device 100, the physical erasing units grouped into the data area 410, the spare area 420, the system area 430, and the replacement area 440 are dynamically changed. For example, when a physical erasing unit in the spare area 420 is damaged and accordingly is replaced by a physical erasing unit in the replacement area 440, the physical erasing unit originally belonging to the replacement area 440 is linked to the spare area 420.

In the present exemplary embodiment, the memory controller 104 configures logical addresses 450(0)-450(E) such that data accesses can be carried out in those physical erasing units containing data. For example, when the memory storage device 100 is formatted by an operating system (OS) 1110 through a file system (for example, FAT 32), the logical addresses 450(0)-450(E) are respectively mapped to the physical erasing units 304(0)-304(A) in the data area 410. Herein the memory management circuit 202 (or memory controller 104) establishes a logical address-physical erasing unit mapping table to record the mapping relationship between the logical addresses and the physical erasing units. In the present exemplary embodiment, the size of each one of the logical addresses 450(0)-450(E) is the same as that of a physical erasing unit (i.e., the logical addresses may also be referred to as logical block addresses (LBA)). However, the size of each logical address is not limited in the invention, and in other exemplary embodiments, the size of each one of the logical addresses 450(0)-450(E) may also be equal to the size of a physical programming unit.

The host system 1000 issues a plurality of read commands to the memory management circuit 202 (or memory controller 104). These read commands instruct to read one or more logical addresses among the logical addresses 450(0)-450(E). The memory management circuit 202 (or memory controller 104) places these read commands into a command queue and determines the execution sequence of the read commands. If the memory management circuit 202 (or memory controller 104) is about to execute a read command, the memory management circuit 202 (or memory controller 104) obtains the logical address to be read by the read command and a physical erasing unit mapped to the logical address. Besides, the memory management circuit 202 (or memory controller 104) reads data from the physical erasing unit and transmits the data to the host system 1000. However, before executing a read command, the memory management circuit 202 (or memory controller 104) pre-reads some data from the physical erasing units 304(0)-304(B) into the buffer memory 252 of the memory controller 104. After that, if the data to be read by the read command already exists in the buffer memory 252, the memory management circuit 202 (or memory controller 104) transmits the data in the buffer memory 252 to the host system 1000, so that the data reading speed is increased. In another exemplary embodiment, the data pre-read by the memory management circuit 202 (or memory controller 104) may also be stored into a buffer memory outside the memory controller 104, which is not limited in the invention.

Figure 5:
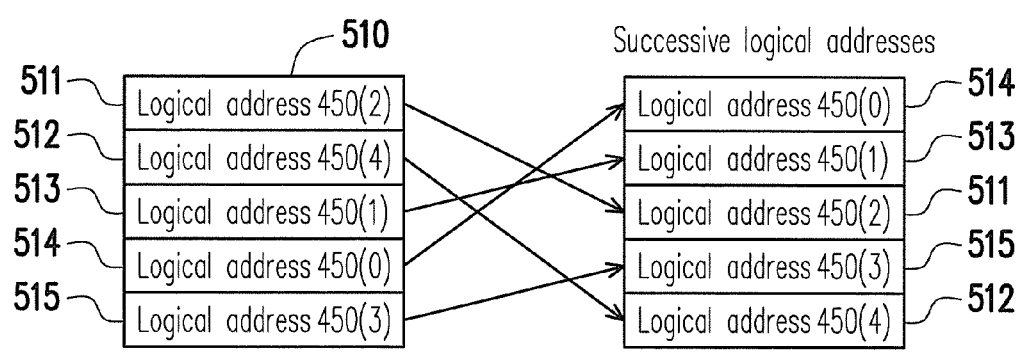
FIG. 5 is a diagram illustrating an example of log file according to an exemplary embodiment of the invention.

FIG. 5 is a diagram illustrating an example of log file according to an exemplary embodiment of the invention.

Referring to FIG. 5, the memory management circuit 202 (or memory controller 104) receives a plurality of read commands (also referred to as first read commands) from the host system 1000, executes these read commands, and then stores the executed read commands into a log file 510. For example, the log file 510 records executed read commands 511-515, and the read commands 511-515 respectively instruct to read the logical addresses 450(2), 450(4), 450(1), 450(0), and 450(3) (also referred to as first logical addresses). The memory management circuit 202 (or memory controller 104)

first receives the read command 511 from the host system 1000 and then sequentially receives the read commands 512-515. In other words, according to the received sequence of the read commands 511-515, the memory management circuit 202 (or memory controller 104) cannot identify whether the host system 1000 is about to read successive logical addresses. However, in the present exemplary embodiment, after the memory management circuit 202 (or memory controller 104) executes the read commands 511-515, it further determines whether the logical addresses read by the read commands 511-515 are successive. For example, after the memory management circuit 202 (or memory controller 104) sorts the logical addresses read by the read commands 511-515, it identifies that the logical addresses 450(0)-450(4) are successive. This means even though the host system 1000 sends the read commands 511-515 to the memory management circuit 202 (or memory controller 104) in sequence, the host system 1000 reads the successive logical addresses 450(0)-450(4). Since the logical addresses 450(0)-450(4) are successive, the logical addresses to be read by the host system 1000 next may be successive too. Thus, the memory management circuit 202 (or memory controller 104) pre-reads data belonging to a logical range.

In the present exemplary embodiment, 5 read commands 511-515 are recorded in the log file 510. However, in other exemplary embodiments, more or fewer read commands may be recorded in the log file 510. Besides, the memory management circuit 202 (or memory controller 104) starts to pre-read data after it determines that n read commands in the log file 510 are successive. Herein n is a positive integer, and the value thereof is not limited in the invention.

Figure 6A:
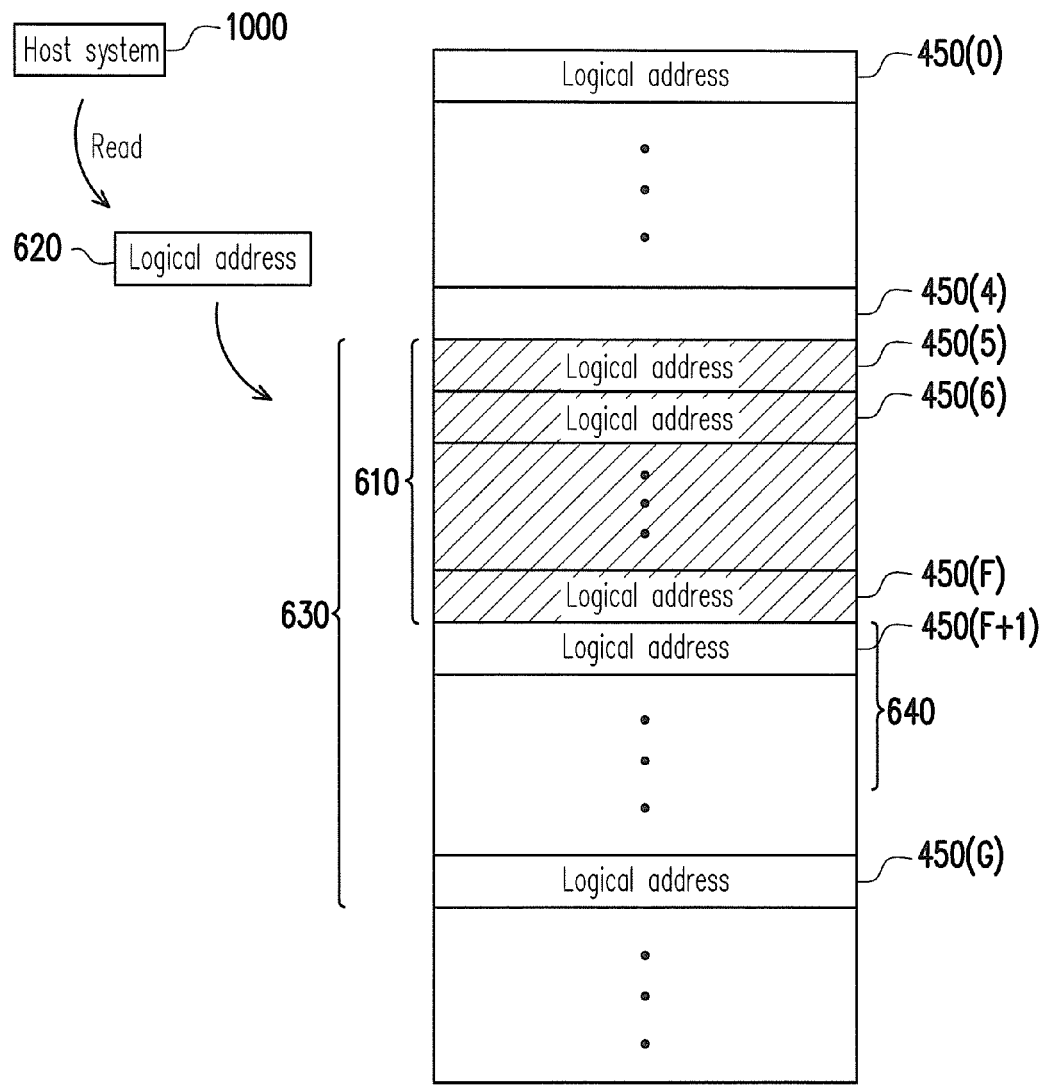
FIG. 6A is a diagram illustrating how data belonging to a logical range is pre-read according to an exemplary embodiment of the invention.

FIG. 6A is a diagram illustrating how data belonging to a logical range is pre-read according to an exemplary embodiment of the invention.

Referring to FIG. 6A, because the logical addresses 450(0)-450(4) to be read by the read commands in the log file 510 are successive, the memory management circuit 202 (or memory controller 104) pre-reads data belonging to a logical range 610 into the buffer memory 252. The memory management circuit 202 (or memory controller 104) also sets up a predetermined range 630. The predetermined range 630 contains the logical range 610. However, the sizes of the logical range 610 and the predetermined range 630 are not limited in the invention. Next, the memory management circuit 202 (or memory controller 104) receives a read command (also referred to as a second read command) from the host system 1000. The second read command instructs to read the logical address 620 (also referred to as a second logical address). The memory management circuit 202 (or memory controller 104) first determines whether the logical address 620 is within the predetermined range 630. If the logical address 620 is within the predetermined range 630, the memory management circuit 202 (or memory controller 104) further determines whether the logical address 620 is a starting logical address (i.e., the logical address 450(5)) of the logical range 610. If the logical address 620 is the logical address 450(5), the memory management circuit 202 (or memory controller 104) reads data belonging to the logical address 620 from the buffer memory 252 and sends the data to the host system 1000.

On the other hand, if the logical address 620 is within the predetermined range 630 but is not the logical address 450(5), the memory management circuit 202 (or memory controller 104) keeps the data belonging to the logical range 610 in the buffer memory 252 and starts a timer. Whether the timer is implemented in a software form or a hardware form is not limited in the invention. Even though presently the host system 1000 is not about to read the logical address 450(5), but since the logical address 620 is still within the predetermined range 630, later on the host system 1000 may read the logical address 450(5) again. Thus, the memory management circuit 202 (or memory controller 104) does not clear the data belonging to the logical range 610 from the buffer memory 252 right after it obtains the second read command. However, if the value recorded by the timer is greater than a threshold, the memory management circuit 202 (or memory controller 104) clears the data belonging to the logical range 610 from the buffer memory 252. In addition, if the logical address 620 is not within the predetermined range 630, the memory management circuit 202 (or memory controller 104) also clears the data belonging to the logical range 610 from the buffer memory 252.

After the timer is started, if the memory management circuit 202 (or memory controller 104) receives a next read command (also referred to as a third read command) from the host system 1000 and the logical address (also referred to as a third logical address) to be read by the third read command is the logical address 450(5), the memory management circuit 202 (or memory controller 104) resets the timer and transmits the data belonging to the logical address 450(5) to the host system 1000.

In other words, the memory management circuit 202 (or memory controller 104) keeps the data belonging to the logical range 610 in the buffer memory 252 until the host system 1000 is about to read a logical address outside the predetermined range 630 or the host system 1000 does not read the logical address 450(5) for a predetermined time (i.e., the value recoded by the timer is greater than a threshold). In an exemplary embodiment, the threshold is in direct ratio to a read time of the rewritable non-volatile memory module 106. The read time is the time required by the rewritable non-volatile memory module 106 for executing a read command. With a longer read time, the memory management circuit 202 (or memory controller 104) increases the threshold to prolong the time for the data belonging to the logical range 610 to be stored in the buffer memory 252. For example, the memory management circuit 202 (or memory controller 104) sets the threshold as two times of the read time. However, the invention is not limited thereto.

In an exemplary embodiment, the memory management circuit 202 (or memory controller 104) may transmit data belonging to multiple logical addresses to the host system 1000 at once. For example, the memory management circuit 202 (or memory controller 104) first receives a read command for reading the logical address 450(6) and then a read command for reading the logical address 450(5) and stores the read command for reading the logical address 450(6) in the command queue first. When the memory management circuit 202 (or memory controller 104) determines that the host system 1000 is about to read the logical address 450(5), the memory management circuit 202 (or memory controller 104) transmits data belonging to the logical addresses 450(5) and 450(6) to the host system 1000. In an exemplary embodiment, the step of transmitting the data belonging to the logical addresses 450(5) and 450(6) to the host system 1000 may also be executed by another circuit (not shown). However, the invention is not limited thereto.

In the present exemplary embodiment, the size of the logical range 610 is equal to the size of the memory space of the buffer memory 252. However, the invention is not limited thereto, and in another exemplary embodiment, the size of the logical range 610 may also be smaller than the size of the memory space of the buffer memory 252. Besides, when the logical address 620 is the logical address 450(5) and data belonging to the logical address 450(5) has been transmitted to the host system 1000, the memory management circuit 202 (or memory controller 104) may also pre-read data belonging to a logical range 640 (also referred to as a second logical range) from the physical erasing units 304(0)-304(R) into the buffer memory 252. The logical range 640 follows the logical range 610, but the size of the logical range 640 is not limited in the invention. For example, if the memory management circuit 202 (or memory controller 104) transmits the data belonging to the logical addresses 450(5) and 450(6) to the host system 1000 at once, the logical range 640 includes two logical addresses. However, the invention is not limited thereto, and in another exemplary embodiment, the memory management circuit 202 (or memory controller 104) may also pre-read data belonging to the logical range 640 when the host system 1000 reads the logical address 450(F) or any other logical address.

In the present exemplary embodiment, the logical range 610 follows the logical addresses 450(0)-450(4). However, in other exemplary embodiments, the logical range 610 may also be ahead of the logical addresses 450(0)-450(4). For example, the host system 1000 reads successive logical addresses from the largest one to the smallest one. Thus, after executing a plurality of read commands corresponding to successive logical addresses, the logical range 610 pre-read by the memory management circuit 202 (or memory controller 104) is before these successive logical addresses, and besides, the logical range 640 is before the logical range 610.

Figure 6B:
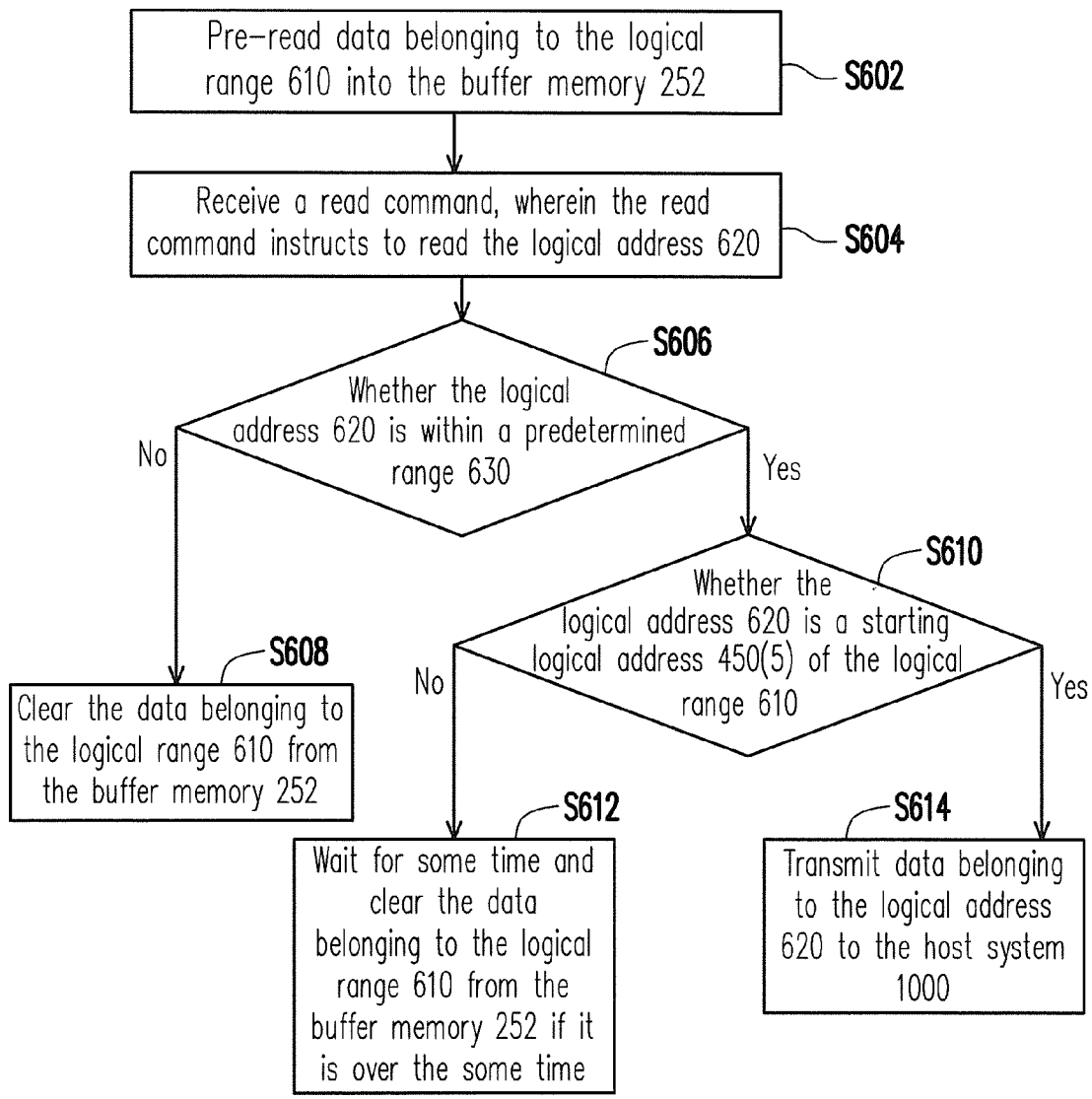
FIG. 6B is a system flowchart after data is pre-read according to an exemplary embodiment of the invention.

FIG. 6B is a system flowchart after the memory management circuit 202 (or memory controller 104) determines to pre-read data according to an exemplary embodiment of the invention.

Referring to FIG. 6B, in step S602, the memory management circuit 202 (or memory controller 104) pre-reads data belonging to the logical range 610 into the buffer memory 252.

In step S604, the memory management circuit 202 (or memory controller 104) receives a read command. The read command instructs to read the logical address 620.

In step S606, the memory management circuit 202 (or memory controller 104) determines whether the logical address 620 is within the predetermined range 630.

If the memory management circuit 202 (or memory controller 104) determines in step S606 that the logical address 620 is not within the predetermined range 630, in step S608, the memory management circuit 202 (or memory controller 104) clears the data belonging to the logical range 610 from the buffer memory 252.

If the memory management circuit 202 (or memory controller 104) determines in step S606 that the logical address 620 is within the predetermined range 630, in step S610, the memory management circuit 202 (or memory controller 104) determines whether the logical address 620 is the starting logical address 450(5) of the logical range 610.

If the memory management circuit 202 (or memory controller 104) determines in step S610 that the logical address 620 is not the starting logical address 450(5) of the logical range 610, in step S612, the memory management circuit 202 (or memory controller 104) waits for some time and clears the data belonging to the logical range 610 from the buffer memory 252 if it is over the some time.

If the memory management circuit 202 (or memory controller 104) determines in step S610 that the logical address 620 is the starting logical address 450(5) of the logical range 610, in step S614, the memory management circuit 202 (or memory controller 104) transmits data belonging to the logical address 620 to the host system 1000.

[Second Exemplary Embodiment]

The second exemplary embodiment is similar to the first exemplary embodiment, and only the differences between the two will be explained herein. Referring to FIG. 6A again, in the first exemplary embodiment, the memory management circuit 202 (or memory controller 104) transmits data to the host system 1000 when the logical address 620 is the logical address 450(5). However, in the second exemplary embodiment, the memory management circuit 202 (or memory controller 104) transmits data to the host system 1000 when the logical address 620 is any logical address within the logical range 610.

To be specific, after pre-reading the data belonging to the logical range 610 and receiving a read command for reading the logical address 620, the memory management circuit 202 (or memory controller 104) determines whether the logical address 620 is within the predetermined range 630. If the logical address 620 is not within the predetermined range 630, the memory management circuit 202 (or memory controller 104) clears the data belonging to the logical range 610 from the buffer memory 252. If the logical address 620 is within the predetermined range 630, the memory management circuit 202 (or memory controller 104) further determines whether the logical address 620 is within the logical range 610. If the logical address 620 is within the logical range 610, the memory management circuit 202 (or memory controller 104) transmits data belonging to the logical address 620 to the host system 1000. If the logical address 620 is within the predetermined range 630 but not within the logical range 610, the memory management circuit 202 (or memory controller 104) keeps the data belonging to the logical range 610 in the buffer memory 252 and starts a timer. If the value recorded by the timer is greater than the threshold, the memory management circuit 202 (or memory controller 104) clears the data belonging to the logical range 610 from the buffer memory 252.

Figure 7:
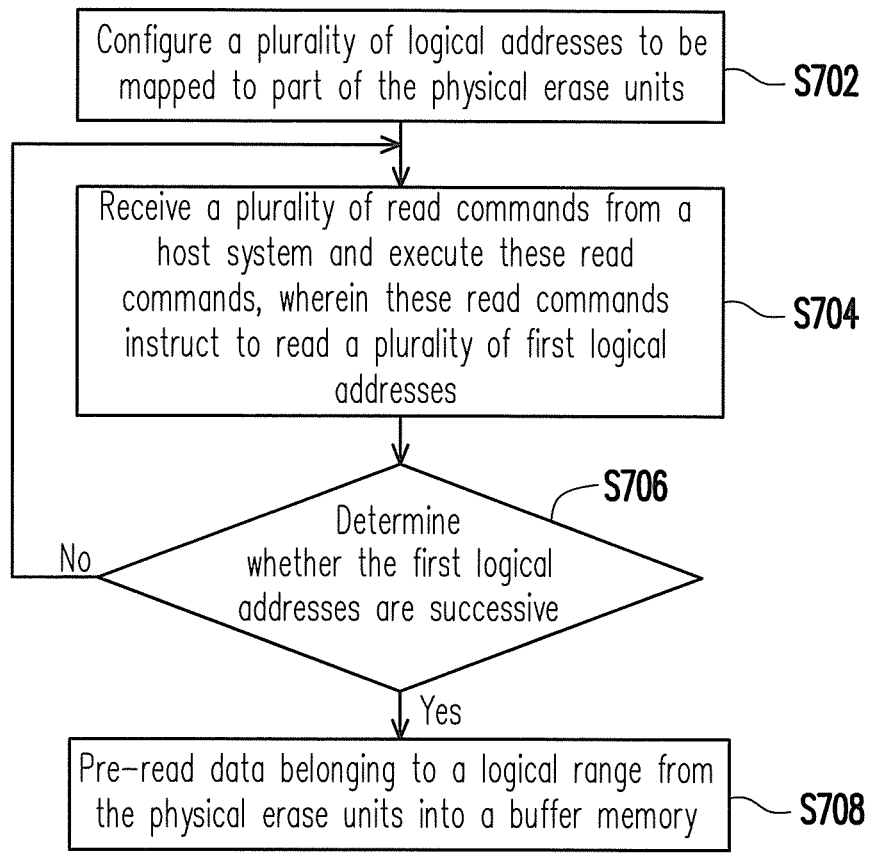
FIG. 7 is a flowchart of a data reading method according to an exemplary embodiment of the invention.

FIG. 7 is a flowchart of a data reading method according to an exemplary embodiment of the invention. It should be noted that the procedure illustrated in FIG. 7 may be implemented along with the first exemplary embodiment or the second exemplary embodiment or may also be implemented independently, which is not limited in the invention.

Referring to FIG. 7, in step S702, the memory management circuit 202 (or memory controller 104) configures a plurality of logical addresses to be mapped to part of the physical erasing units.

In step S704, the memory management circuit 202 (or memory controller 104) receives a plurality of read commands from a host system and executes these read commands. These read commands instruct to read a plurality of first logical addresses.

In step S706, the memory management circuit 202 (or memory controller 104) determines whether the first logical addresses are successive. If the memory management circuit 202 (or memory controller 104) determines in step S706 that the first logical addresses are not successive, the memory management circuit 202 (or memory controller 104) executes step S704 again to receive the next read command and determine whether the logical addresses to be read by n executed read commands are successive. If the memory management circuit 202 (or memory controller 104) determines in step S706 that the first logical addresses are successive, the memory management circuit 202 (or memory controller 104) executes step S708.

In step S708, the memory management circuit 202 (or memory controller 104) pre-reads data belonging to a logical range from the physical erasing units into a buffer memory. The buffer memory can be disposed inside or outside the memory controller 104.

The steps in FIG. 7 have been explained in detail above therefore will not be described herein. On the other hand, the steps in FIG. 7 can be implemented as a plurality of program codes or circuits. However, whether the data reading method illustrated in FIG. 7 is implemented in a software form or a hardware form is not limited in the invention.

As described above, in a data reading method, a memory controller, and a memory storage device provided by embodiments of the invention, whether a host system reads successive logical addresses is determined to determine whether data needs to be pre-read. Besides, whether the pre-read data is kept in a buffer memory is determined according to whether the next logical address to be read by the host system (or the logical address to be read by a read command in a command queue) is within a predetermined range. Thereby, the data reading speed is increased.

The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data reading method for a rewritable non-volatile memory module, wherein the rewritable non-volatile memory module comprises a plurality of physical erasing units, the data reading method comprising:
   configuring a plurality of logical addresses to be mapped to a part of the physical erasing units;
   receiving a plurality of first read commands from a host system, wherein the first read commands instruct to read a plurality of first logical addresses among the logical addresses;
   executing the first read commands;
   rearranging the first logical addresses as a plurality of rearranged first logical addresses in an ascending or a descending order and determining whether the first logical addresses are successive according to the rearranged first logical addresses; and
   if the first logical addresses are successive, pre-reading data belonging to a first logical range among he logical addresses from the physical erasing units into a buffer memory.

2. The data reading method according to claim 1 further comprising:
   receiving a second read command from the host system, wherein the second read command instructs to read a second logical address among the logical addresses;
   determining whether the second logical address is within a predetermined range among the logical addresses, wherein the predetermined range comprises the first logical range;
   if the second logical address is within the predetermined range, determining whether the second logical address is a starting logical address of the first logical range; and
   if the second logical address is the starting logical address, transmitting data belonging to the second logical address to the host system.

3. The data reading method according to claim 2 further comprising:
   if the second logical address is the starting logical address, pre-reading data belonging to a second logical range among the logical addresses from the physical erasing units into the buffer memory, wherein the second logical range is right after the first logical range.

4. The data reading method according to claim 2 further comprising:
   if the second logical address is not the starting logical address, keeping the data belonging to the first logical range in the buffer memory, and starting a timer; and
   if a value recorded by the timer is greater than a threshold, clearing the data belonging to the first logical range from the buffer memory.

5. The data reading method according to claim 4, wherein the threshold is in direct ratio to a read time of the rewritable non-volatile memory module.

6. The data reading method according to claim 4 further comprising:
   receiving a third read command from the host system, wherein the third read command instructs to read a third logical address among the logical addresses; and
   if the third logical address is the starting logical address, resetting the timer, and transmitting data belonging to the third logical address to the host system.

7. The data reading method according to claim 2 further comprising:
   if the second logical address is not within the predetermined range, clearing the data belonging to the first logical range from the buffer memory.

8. The data reading method according to claim 1 further comprising:
   receiving a second read command from the host system, wherein the second read command instructs to read a second logical address among the logical addresses;
   determining whether the second logical address is within a predetermined range in the logical addresses, wherein the predetermined range comprises the first logical range;
   if the second logical address is within the predetermined range, determining whether the second logical address is within the first logical range; and
   if the second logical address is within the first logical range, transmitting data belonging to the second logical address to the host system.

9. The data reading method according to claim 8 further comprising:
   if the second logical address is not within the first logical range, keeping the data belonging to the first logical range in the buffer memory, and starting a timer; and
   if a value recorded by the timer is greater than a threshold, clearing the data belonging to the first logical range from the buffer memory.

10. The data reading method according to claim 1, wherein a size of the first logical range is equal to a size of a memory space of the buffer memory.

11. A memory storage device, comprising:
    a connector, configured to couple to a host system;
    a rewritable non-volatile memory module, comprising a plurality of physical erasing units; and
    a memory controller, coupled to the connector and the rewritable non-volatile memory module, configured to configure a plurality of logical addresses to be mapped to a part of the physical erasing units, and to receive a plurality of first read commands from the host system, wherein the first read commands instruct to read a plurality of first logical addresses among the logical addresses,
wherein the memory controller is configured to execute the first read commands, rearrange the first logical addresses as a plurality of rearranged first logical addresses in an ascending or a descending order, and determine whether the first logical addresses are successive according to the rearranged first logical addresses,
if the first logical addresses are successive, the memory controller is configured to pre-read data belonging to a first logical range among the logical addresses from the physical erasing units into a buffer memory.

12. The memory storage device according to claim 11, wherein the memory controller is further configured to receive a second read command from the host system, wherein the second read command instructs to read a second logical address among the logical addresses,
the memory controller is further configured to determine whether the second logical address is within a predetermined range among the logical addresses, wherein the predetermined range comprises the first logical range,
if the second logical address is within the predetermined range, the memory controller is configured to determine whether the second logical address is a starting logical address of the first logical range,
if the second logical address is the starting logical address, the memory controller is configured to transmit data belonging to the second logical address to the host system.

13. The memory storage device according to claim 12, wherein if the second logical address is not the starting logical address, the memory controller is configured to keep the data belonging to the first logical range in the buffer memory and start a timer,
if a value recorded by the timer is greater than a threshold, the memory controller is configured to clear the data belonging to the first logical range from the buffer memory.

14. The memory storage device according to claim 13, wherein the memory controller is further configured to receive a third read command from the host system, wherein the third read command instructs to read a third logical address among the logical addresses,
if the third logical address is the starting logical address, the memory controller is further configured to reset the timer and transmit data belonging to the third logical address to the host system.

15. The memory storage device according to claim 11, wherein the memory controller is further configured to receive a second read command from the host system, wherein the second read command instructs to read a second logical address among the logical addresses,
the memory controller is further configured to determine whether the second logical address is within a predetermined range among the logical addresses, wherein the predetermined range comprises the first logical range,
if the second logical address is within the predetermined range, the memory controller is configured to determine whether the second logical address is within the first logical range,
if the second logical address is within the first logical range, the memory controller is configured to transmit data belonging to the second logical address to the host system.

16. The memory storage device according to claim 15, wherein if the second logical address is not within the first logical range, the memory controller is configured to keep the data belonging to the first logical range in the buffer memory and starts a timer,
if a value recorded by the timer is greater than a threshold, the memory controller is configured to clear the data belonging to the first logical range from the buffer memory.

17. A memory controller, for controlling a rewritable non-volatile memory module, the memory controller comprising:
a host interface, configured to couple to a host system;
a memory interface, configured to couple to the rewritable non-volatile memory module, wherein the rewritable non-volatile memory module comprises a plurality of physical erasing units; and
a memory management circuit, coupled to the host interface and the memory interface, configured to configure a plurality of logical addresses to be mapped to a part of the physical erasing units, and to receive a plurality of first read commands from the host system, wherein the first read commands instruct to read a plurality of first logical addresses among the logical addresses,
wherein the memory management circuit is configured to execute the first read commands, rearrange the first logical addresses as a plurality of rearranged first logical addresses in an ascending or a descending order, and determine whether the first logical addresses are successive according to the rearranged first logical addresses,
if the first logical addresses are successive, the memory management circuit is configured to pre-read data belonging to a first logical range among the logical addresses from the physical erasing units into a buffer memory.

18. The memory controller according to claim 17, wherein the memory management circuit is configured to receive a second read command from the host system, wherein the second read command instructs to read a second logical address among the logical addresses,
the memory management circuit is configured to determine whether the second logical address is within a predetermined range among the logical addresses, wherein the predetermined range comprises the first logical range,
if the second logical address is within the predetermined range, the memory management circuit is configured to determine whether the second logical address is a starting logical address of the first logical range,
if the second logical address is the starting logical address, the memory management circuit is configured to transmit data belonging to the second logical address to the host system.

19. The memory controller according to claim 18, wherein if the second logical address is the starting logical address, the memory management circuit is configured to pre-read data belonging to a second logical range among the logical addresses from the physical erasing units into the buffer memory, wherein the second logical range is right after the first logical range.

20. The memory controller according to claim 18, wherein if the second logical address is not the starting logical address, the memory management circuit is configured to keep the data belonging to the first logical range in the buffer memory and start a timer,
if a value recorded by the timer is greater than a threshold, the memory management circuit is configured to clear the data belonging to the first logical range from the buffer memory.

21. The memory controller according to claim 20, wherein the threshold is in direct ratio to a read time of the rewritable non-volatile memory module.

22. The memory controller according to claim 20, wherein the memory management circuit is configured to receive a third read command from the host system, wherein the third read command instructs to read a third logical address among the logical addresses, if the third logical address is the starting logical address, the memory management circuit is configured to reset the timer and transmit data belonging to the third logical address to the host system.

23. The memory controller according to claim 18, wherein if the second logical address is not within the predetermined range, the memory management circuit is configured to clear the data belonging to the first logical range from the buffer memory.

24. The memory controller according to claim 17, wherein the memory management circuit is configured to receive a second read command from the host system, wherein the second read command instructs to read a second logical address among the logical addresses, the memory management circuit is further configured to determine whether the second logical address is within a predetermined range among the logical addresses, wherein the predetermined range comprises the first logical range, if the second logical address is within the predetermined range, the memory management circuit is configured to determine whether the second logical address is within the first logical range, if the second logical address is within the first logical range, the memory management circuit is configured to transmit data belonging to the second logical address to the host system.

25. The memory controller according to claim 24, wherein if the second logical address is not within the first logical range, the memory management circuit is configured to keep the data belonging to the first logical range in the buffer memory and start a timer, if a value recorded by the timer is greater than a threshold, the memory management circuit is configured to clear the data belonging to the first logical range from the buffer memory.

26. The memory controller according to claim 25, wherein a size of the first logical range is equal to a size of a memory space of the buffer memory.

* * * * *